United States Patent
Kim et al.

(10) Patent No.: US 11,177,925 B2
(45) Date of Patent: Nov. 16, 2021

(54) METHOD FOR SETTING FRAME STRUCTURE IN WIRELESS COMMUNICATION SYSTEM AND DEVICE THEREFOR

(71) Applicant: LG ELECTRONICS INC., Seoul (KR)

(72) Inventors: Youngtae Kim, Seoul (KR); Hanbyul Seo, Seoul (KR); Kijun Kim, Seoul (KR); Eunsun Kim, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 649 days.

(21) Appl. No.: 15/999,464

(22) PCT Filed: Feb. 20, 2017

(86) PCT No.: PCT/KR2017/001835
§ 371 (c)(1),
(2) Date: Aug. 17, 2018

(87) PCT Pub. No.: WO2017/142378
PCT Pub. Date: Aug. 24, 2017

(65) Prior Publication Data
US 2021/0211259 A1 Jul. 8, 2021

Related U.S. Application Data

(60) Provisional application No. 62/297,089, filed on Feb. 18, 2016.

(51) Int. Cl.
*H04W 4/00* (2018.01)
*H04L 5/00* (2006.01)
*H04W 72/04* (2009.01)

(52) U.S. Cl.
CPC ......... *H04L 5/0055* (2013.01); *H04W 72/042* (2013.01); *H04W 72/0446* (2013.01); *H04L 5/0007* (2013.01)

(58) Field of Classification Search
CPC .. H04L 5/0055; H04L 5/0007; H04W 72/042; H04W 72/0446
(Continued)

(56) References Cited

U.S. PATENT DOCUMENTS

2010/0098019 A1* 4/2010 Kim ............... H04L 1/1858
370/330
2010/0290370 A1 11/2010 Li et al.
(Continued)

FOREIGN PATENT DOCUMENTS

| CN | 104782167 | 7/2015 |
|---|---|---|
| KR | 1020120035106 | 4/2012 |
| KR | 1020130088180 | 8/2013 |

OTHER PUBLICATIONS

PCT International Application No. PCT/KR2017/001835, Written Opinion of the International Searching Authority dated May 17, 2017, 18 pages.
(Continued)

*Primary Examiner* — Mang Hang Yeung
(74) *Attorney, Agent, or Firm* — Lee, Hong, Degerman, Kang & Waimey

(57) ABSTRACT

The present invention relates to a method and a device for transmitting, by a terminal, an acknowledgement (ACK)/negative-acknowledgement (NACK) in a wireless communication system. More specifically, the method comprises the steps of: receiving downlink data resource allocation information for indicating a specific subframe for ACK/NACK transmission; and transmitting an ACK/NACK in a specific subframe, wherein the downlink data allocation information includes a specific sequence among a plurality
(Continued)

of sequences defined for a downlink control area, and a frame structure of the specific subframe is determined on the basis of the specific sequence.

12 Claims, 5 Drawing Sheets

(58) Field of Classification Search
USPC .......................................................... 370/329
See application file for complete search history.

(56) References Cited

U.S. PATENT DOCUMENTS

| | | |
|---|---|---|
| 2011/0126071 A1 | 5/2011 | Han et al. |
| 2015/0043408 A1 | 2/2015 | Morioka |
| 2016/0323852 A1* | 11/2016 | Golitschek Edler Von Elbwart ................ H04L 1/1887 |
| 2017/0353204 A1 | 12/2017 | He et al. |

OTHER PUBLICATIONS

European Patent Office Application Serial No. 17753539.0, Search Report dated Sep. 6, 2019, 7 pages.
Qualcomm, "Adaptive frame structure and DL-UL configuration for LAA", 3GPP TSG RAN WG1 Meeting #83, R1-157044, XP051003347, Nov. 2015, 4 pages.
European Patent Office Application Serial No. 17753539.0, Search Report dated Mar. 1, 2021, 6 pages.

* cited by examiner (a) Control-plane protocol stack (b) User-plane protocol stack

METHOD FOR SETTING FRAME STRUCTURE IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/001835, filed on Feb. 20, 2017, which claims the benefit of U.S. Provisional Application No. 62/297,089, filed on Feb. 18, 2016, the contents of which are all hereby incorporated by reference herein in its entirety.

TECHNICAL FIELD

The present invention relates to a wireless communication system, and more specifically, to a method for setting a frame structure in a communication system and a device therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.25, 2.5, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised in view of the aforementioned circumstances is to provide a method for configuring a frame structure in a wireless communication system and a device therefor Technical tasks obtainable from the present invention are non-limited by the above-mentioned technical task. And, other unmentioned technical tasks can be clearly understood from the following description by those having ordinary skill in the technical field to which the present invention pertains.

Technical Solution

In one aspect of the present invention to solve the aforementioned problem, a method of transmitting acknowledgement/negative-acknowledgement (ACK/NACK) by a UE in a wireless communication system includes: receiving downlink data resource allocation information indicating a specific subframe for ACK/NACK transmission; and transmitting ACK/NACK in the specific subframe, wherein the downlink data allocation information includes a specific sequence among a plurality of sequences defined for a downlink control region, and a frame structure of the specific subframe is determined on the basis of the specific sequence.

Further, the downlink data resource allocation information may be indicated using a subframe unit composed of at least one subframe.

Further, the downlink data resource allocation information may indicate an ACK/NACK resource region based on the structure of the specific subframe.

Further, the downlink data resource allocation information may indicate a plurality of subframes for ACK/NACK transmission, and the method may further include selecting the specific subframe among the plurality of subframes for ACK/NACK transmission.

Further, the method may further include determining a first subframe and a last subframe associated with multiple TTI (Transmission Time Interval) transmission on the basis of the downlink data resource allocation information and determining structures of a plurality of subframes for multiple TTI transmission.

Further, the last subframe may be an uplink subframe, and the last subframe may be determined by detecting sequences of the plurality of subframes for multiple TTI transmission.

Further, the downlink data resource allocation information may indicate at least one subframe having an uplink control region present in a predetermined time window.

Further, the time window may be set differently for UE capabilities or service characteristics and may be indicated through RRC (Radio Resource Control) signaling.

Further, the downlink data resource allocation information may indicate at least one subframe having an uplink control region present for each of time groups which do not overlap.

Further, the ACK/NACK may be generated by applying FDM (Frequency Division Multiplexing) and then applying CDM (Code Division Multiplexing). Further, the ACK/NACK may be mapped to an ACK/NACK resource index defined by combining a code index for CDM and a frequency band for FDM or the ACK/NACK resource index may be determined on the basis of one of a time index, a downlink control channel index, a lowest frequency index of a downlink resource, an index indicated in a downlink control region and a resource index according to RRC signaling.

Further, the specific sequence may use a reference signal sequence.

In another aspect of the present invention to solve the aforementioned problem, a UE transmitting acknowledgement/negative-acknowledgement (ACK/NACK) in a wireless communication system includes: a radio frequency (RF) unit; and a processor, wherein the processor is configured to receive downlink data resource allocation information indicating a specific subframe for ACK/NACK transmission and to transmit ACK/NACK in the specific subframe, wherein the downlink data allocation information includes a specific sequence among a plurality of sequences defined for a downlink control region, and a frame structure of the specific subframe is determined on the basis of the specific sequence.

Advantageous Effects

According to embodiments of the present invention, it is possible to efficiently configure a frame structure in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). CDMA may be implemented by radio technology such as UTRA (universal terrestrial radio access) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, and evolved UTRA (E-UTRA). UTRA is a part of a universal mobile telecommunications system (UMTS). 3rd generation partnership project long term evolution (3GPP LTE) is a part of evolved UMTS (E-UMTS) that uses E-UTRA, and adopts OFDMA in downlink and SC-FDMA in uplink. LTE-advanced (LTE-A) is an evolved version of 3GPP LTE.

For clarification of the description, although the following embodiments will be described based on 3GPP LTE/LTE-A, it is to be understood that the technical spirit of the present invention is not limited to 3GPP LTE/LTE-A. Also, specific terms hereinafter used in the embodiments of the present invention are provided to assist understanding of the present invention, and various modifications may be made to the specific terms within the range that they do not depart from the technical spirit of the present invention.

Figure 1:
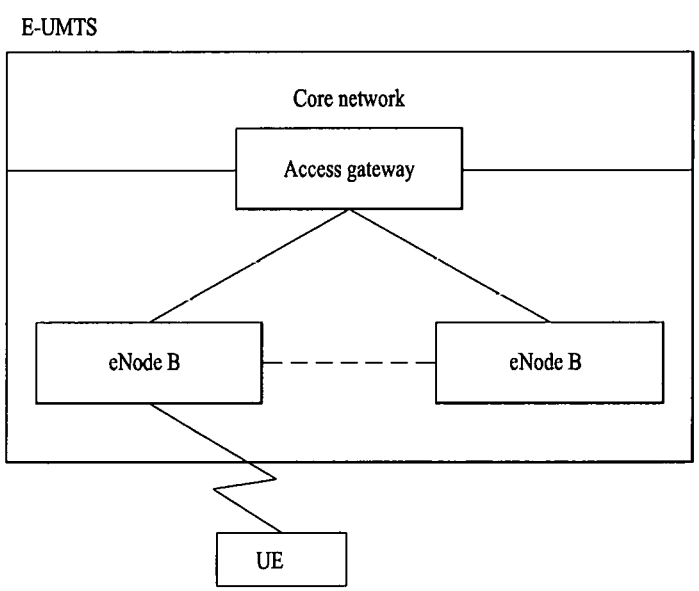
FIG. 1 schematically illustrates an E-UMTS network structure as an example of a wireless communication system.
Figure 2:
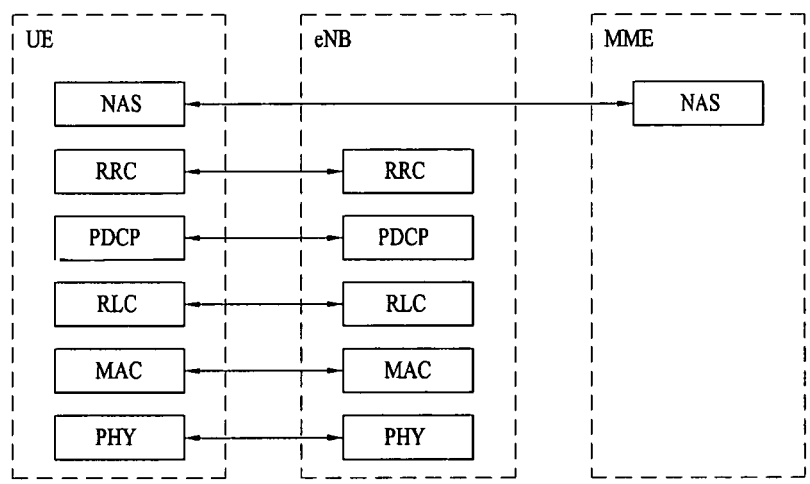
FIG. 2 illustrates control plane and user plane structures of a radio interface protocol between a UE and an E-UTRAN on the basis of the 3GPP wireless access network standard.
Figure 2:
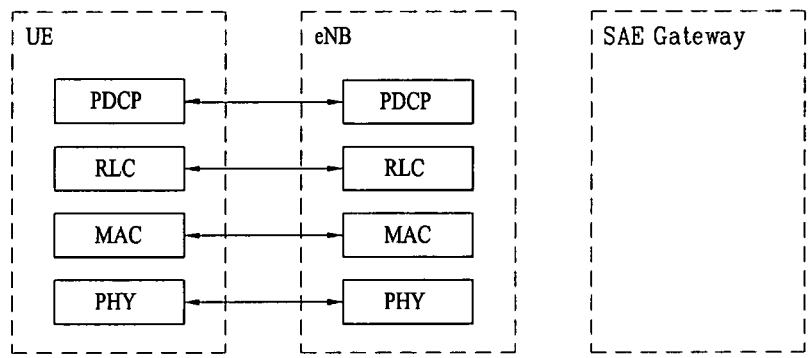

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
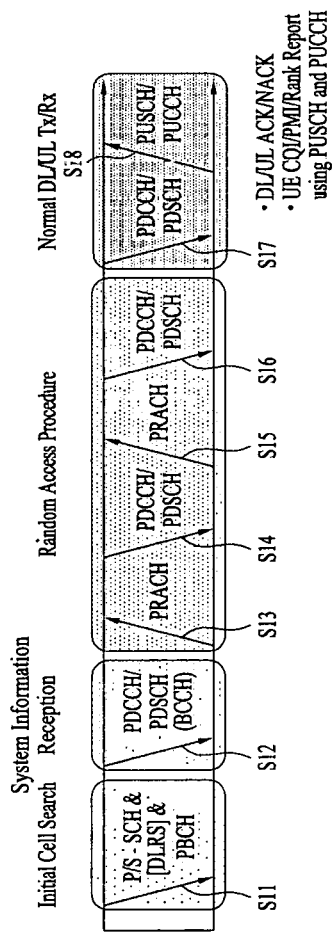
FIG. 3 illustrates physical channels used in a 3GPP system and a general signal transmission method using the same.

FIG. 3 illustrates physical channels used in a 3GPP system and a general method for transmitting a signal using the physical channels.

A user equipment (UE) performs initial cell search such as synchronizing with a base station when it newly enters a cell or the power is turned on (S301). To this end, the UE synchronizes with the base station by receiving a primary synchronization channel (P-SCH) and a secondary synchronization channel (S-SCH) from the base station, and acquires information such as cell ID, etc. Afterwards, the UE may acquire broadcast information within the cell by receiving a physical broadcast channel (PBCH) from the base station. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH (S302).

The UE may perform a random access procedure (RACH) to complete access to the base station when the UE initially accesses the BS or has no radio resources for signal transmission (S303 to S306). To this end, the UE may transmit a specific sequence through a preamble over a physical random access channel (PRACH) (S303 and S305) and may receive a response message to the preamble through the PDCCH and the PDSCH corresponding to the PDCCH (S304 and S306). In the case of a contention based RACH, the UE may additionally perform a contention resolution procedure.

Having performed the above described procedures, the UE may be able to perform a PDCCH/PDSCH reception (S307) and a PUSCH/PUCCH (physical uplink shared channel/physical uplink control channel) transmission (S308) as a general uplink/downlink signal transmission procedure. Particularly, the UE receives downlink control information (DCI) through the PDCCH. Here, DCI includes control information such as resource allocation information about the UE and has a format depending on purpose of use. Control information transmitted from the UE to the base station on uplink or transmitted from the base station to the UE includes a downlink/uplink ACK/NACK signal, a channel quality indicator (CQI), a precoding matrix index (PMI), a rank indicator (RI), etc. In 3GPP LTE, the UE can transmit the control information such as CQI/PMI/RI through a PUSCH and/or a PUCCH.

Figure 4:
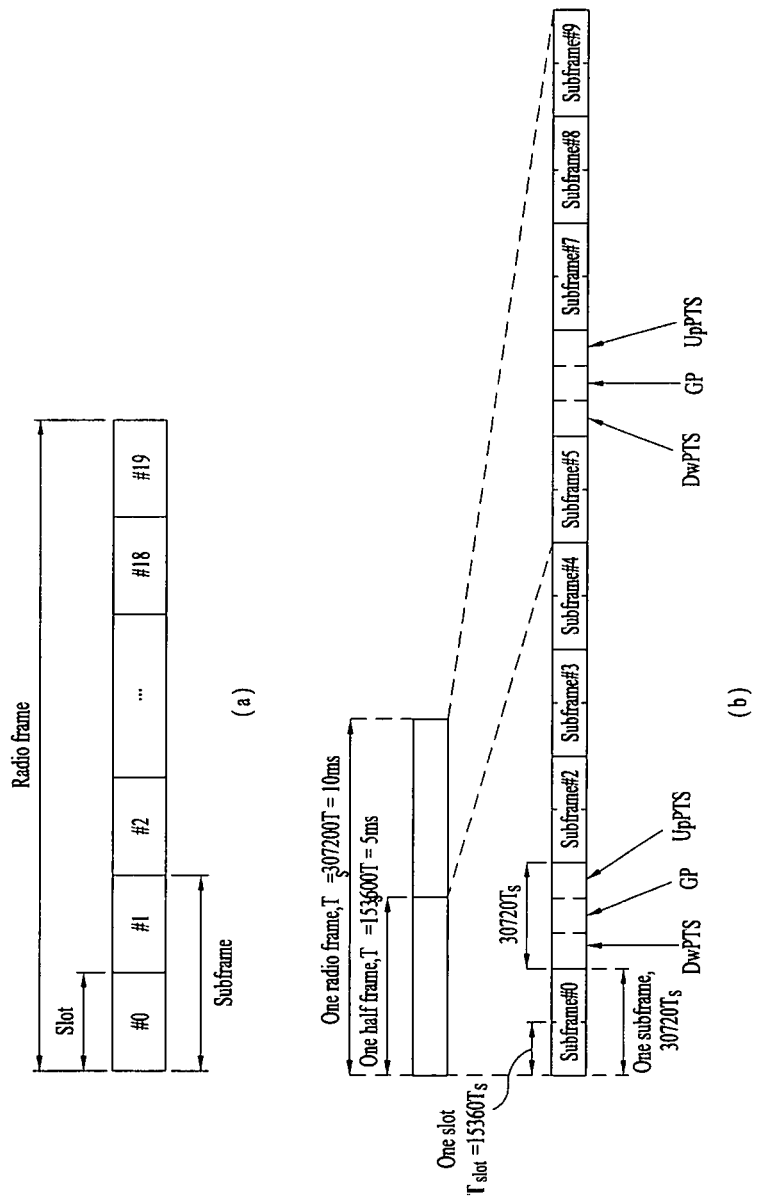
FIG. 4 illustrates a radio frame structure used in LTE.

FIG. 4 illustrates a structure of a radio frame used in LTE.

Referring to FIG. 4, in a cellular OFDM wireless packet communication system, transmission of an uplink/downlink data packet is performed on a subframe by subframe basis and one subframe is defined as a specific period including a plurality of OFDM symbols. 3GPP LTE standards support a type-1 radio frame structure applicable to FDD (Frequency Division Duplex) and a type-2 radio frame structure applicable to TDD (Time Division Duplex).

FIG. 4(a) illustrates the type-1 radio frame structure. A downlink radio frame includes 10 subframes, each of which includes two slots in the time domain. A time taken to transmit one subframe is called a TTI (transmission time interval). For example, one subframe may be 1 ms in length and one slot may be 0.5 ms in length. One slot includes a plurality of OFDM symbols in the time domain and a plurality of resource blocks (RBs) in the frequency domain. 3GPP LTE uses OFDMA on downlink and thus an OFDM symbol refers to one symbol period. An OFDM symbol may also be referred to as an SC-FDMA symbol or a symbol period. An RB as a resource allocation unit may include a plurality of consecutive subcarriers in one slot.

The number of OFDM symbols included in one slot may depend on a CP (Cyclic Prefix) configuration. The CP includes an extended CP and a normal CP. For example, when the OFDM symbol is configured according to the normal CP, the number of OFDM symbols included in one slot may be 7. When the OFDM symbol is configured according to the extended CP, the length of one OFDM symbol increases and thus the number of OFDM symbols included in one slot is less than that in the case of the normal CP. In the extended CP, for example, the number of OFDM symbols included in one slot can be 6. In the case of unstable channel state such as rapid movement of a UE at a high speed, the extended CP can be used to reduce inter-symbol interference.

When the normal CP is used, one slot includes 7 OFDM symbols and thus one subframe includes 14 OFDM symbols. Here, a maximum of three OFDM symbols located in a front portion of each subframe may be allocated to a PDCCH (Physical Downlink Control Channel) and the remaining symbols may be allocated to a PDSCH (Physical Downlink Shared Channel).

FIG. 4(b) illustrates the type-2 radio frame structure. The type-2 radio frame includes two half frames and each half frame is composed of four normal subframes each of which includes two slots and a special subframe including two slots, a DwPTS (Downlink Pilot Time Slot), a GP (Guard Period) and a UpPTS (Uplink Pilot Time Slot).

In the special subframe, the DwPTS is used for initial cell search, synchronization or channel estimation in a UE. The UpPTS is used for channel estimation and uplink transmission synchronization of a UE in a BS. That is, the DwPTS is used for downlink transmission and the UpPTS is used for uplink transmission. Particularly, the UpPTS is used for transmission of a PRACH preamble or SRS. The GP is used to eliminate interference generated on uplink due to multipath delay of a downlink signal between uplink and downlink.

With respect to the special subframe, a configuration is currently defined in 3GPP standard document as shown in Table 1. Table 1 shows DwPTS and UpPTS when $T_s=1/(15000 \times 2048)$ and the remaining period is set to a GP.

Figure 5:
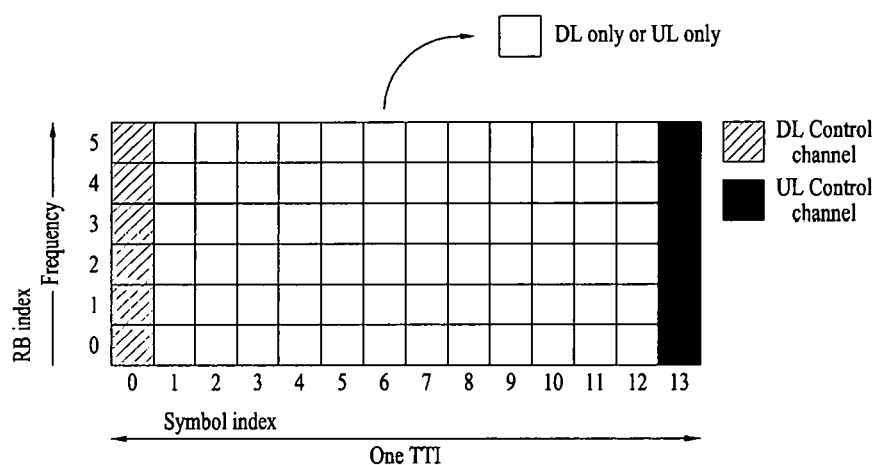
FIG. 5 illustrates a self-contained frame structure according to an embodiment to which the present invention is applicable.

FIG. 5 shows only one TTI (Transmission Time Interval) for convenience of description. A downlink control region may be allocated to the front part of the frame, an uplink control region may be allocated to the rear part of the frame, and the remaining region of the frame may be used for at least one of downlink and uplink.

The structure of FIG. 5 has the advantage that downlink data and uplink ACK/NACK can be simultaneously transmitted in one TTI. This structure is more effective when used by a specific UE which requires short delay.

However, the structure of FIG. 5 requires a gap during switching from downlink to uplink. This gap may be used for downlink/uplink switching or used as a downlink data decoding time. Here, if one TTI is set to about 0.2 ms by reducing a subcarrier spacing and the gap is set to 20 μs, subframes have a gap of 1/10 and thus efficiency in resource utilization for uplink/downlink communication deteriorates.

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | | |
| 9 | $13168 \cdot T_s$ | | | — | — | — |

The type-2 radio frame structure, that is, an uplink/downlink (UL/DL) configuration in a TDD system is shown in Table 2.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe and S represents the special subframe. In addition, Table 2 shows downlink-to-uplink switching periodicity in a UL/DL subframe configuration in each system.

The aforementioned radio frame structure is merely an example and the number of subframes included in a radio frame, the number of slots included in a subframe and the number of symbols included in a slot may be varied.

On the basis of the above description, the present invention discloses dynamic change in a frame structure in fifth-generation new RAT.

In fifth-generation new RAT, various frame structures are under discussion. FIG. 5 illustrates a self-contained frame structure proposed in new RAT.

In addition, some specific UEs (e.g., UEs which require low latency) may be configured to use the self-contained frame structure as illustrated in FIG. 5 and other UEs or other services which do not require low latency may be configured to use frame structures other than the self-contained frame structure. Here, frame structures for multiple TTI DL/UL transmission may be considered as other frame structures. Such multiple transmission may be used as a format which is more useful for a large amount of data transmission than for very low latency.

Accordingly, the self-contained frame structure and the multi-frame structure for multiple TTI DL/UL transmission may be dynamically changed and used whenever transmission is performed to improve resource utilization efficiency and service flexibility.

Therefore, the present invention may use different reference signal (RS) sequences or RS signal sequence sets for respective subframes in order to support a dynamic frame structure. Furthermore, such RS sequences may be signaled only in a downlink region.

Furthermore, in supporting changes in the dynamic frame structure according to the present invention, ACK/NACK timing may be an issue. When ACK/NACK is transmitted after a predetermined time from reception of downlink data as in legacy LTE, a resource region in which ACK/NACK can be transmitted needs to be allocated to all subframes in order to generate ACK/NACK timing. In this case, the advantage of using the dynamic frame structure is attenuated.

In addition, even if a frame structure is dynamically configured, when a resource region for ACK/NACK is allocated to specific subframes, a subframe carrying ACK/NACK needs to be selected according to ACK/NACK timing. Accordingly, the advantage of using the dynamic frame structure is attenuated.

Meanwhile, AKC/NACK timing may be varied. However, this method requires designation of ACK/NACK timing per UE, increasing overhead. Accordingly, the present invention proposes methods of signaling a time at which a subframe capable of carrying ACK/NACK will appear on the basis of variable ACK/NACK timing.

First Method

How many subframes are ahead of a subframe capable of carrying ACK/NACK is signaled in a control region for DL data resource allocation control (e.g., a cell-specific control region or a UE-specific control region in association with DL data resource allocation). Here, such signaling may indicate the first appearing subframe among subframes capable of carrying ACK/NACK or indicate an ACK/NACK timing preferred by an eNB. Furthermore, when an ACK/NACK timing is signaled, the ACK/NACK timing may be signaled in a region of transmitted data instead of a control region or through a reference signal for the region of transmitted data.

In addition, when how many subframes are ahead of an ACK/NACK transmission region is signaled, how many subframes are ahead of an ACK/NACK transmission region may be signaled using a subframe unit or whether an ACK/NACK transmission region appears after multiple subframes using a multiple subframe unit. Such transmission units (e.g., subframe unit and multiple subframe unit) may be signaled through RRC signaling.

When the first method is applied, a resource region in which ACK/NACK can be transmitted may appear in two or more frame structures. Here, resource regions for ACK/NACK transmission may be differently designed for respective frame structures and a frame structure per resource region may be signaled. Alternatively, it may be possible to signal frame structures having resource regions in which ACK/NACK can be transmitted. Here, when frame structures have the same ACK/NACK transmission resource region and thus there are no problems in ACK/NACK transmission, which frame structures have ACK/NACK transmission resource regions may not be exactly signaled.

Furthermore, ACK/NACK timing signaled according to the first method may be signaled through a plurality of subframes. In this case, a UE may select one of a plurality of ACK/NACK timings and transmit ACK/NACK at the selected timing or may set an ACK/NACK timing according to a predetermined rule.

Accordingly, a UE which is aware of an ACK/NACK timing according to the first method may transmit ACK/NACK at that timing.

In the first method, the following 8 frame structures including the self-contained frame structure of FIG. 5 may be considered.

1) DL control+DL data→downlink only subframe
2) DL data→downlink data only subframe
3) DL data+UL control
4) DL control+DL data+gap+UL control
5) DL control+gap+UL data+UL control
6) DL control+gap+UL data
7) UL data→uplink data only subframe
8) UL data+UL control→uplink only subframe Among the aforementioned 8 frame structures, 4) and 5) may be represented by FIG. 5. Multiple TTI DL may be performed when frame structures 1), 2) and 3) among the 8 frame structures are consecutively used and multiple TTI UL may be performed when frame structures 6), 7) and 8) are consecutively used. Here, the length of multiple TTIs may be controlled by continuously arranging frame structure 2) or 7).

Accordingly, frame structures according to the present invention may be dynamically changed according to UE and communication service. When a frame structure is dynamically changed, it is desirable to indicate the frame structure in a DL control region.

To be aware of an ACK/NACK timing, a UE needs to know a position of a UL control region as in frame structures 3), 4), 5) and 8) among the aforementioned 8 frame structures. Since frame structures 4) and 5) have a DL control region, the UE can be aware of presence of a UL control region.

Although frame structure 3) has no DL control region, a position at which a multiple TTI subframe ends in the DL control region of frame structure 1) can be recognized if frame structures 1), 2) and 3) are combined to consider a frame structure for multiple TTI DL. By using this, the UE may determine presence or absence of a UL control region in a subframe having frame structure 3).

With respect to frame structure 8), a position at which a multiple TTI subframe ends in the DL control region of frame structure 6) can be recognized if frame structures 6), 7) and 8) are combined to consider a frame structure for multiple TTI UL. By using this, the UE may determine presence or absence of a DL control region in a subframe having frame structure 8).

However, it is difficult to use frame structures 2) and 3) alone without a subframe in frame structure 1), that is, without a DL control region because it is not easy to perform data transmission without a control signal. It is not appropriate to use frame structure 7) alone without associating it with frame structure 6) because frame structure 7) has no UL control region and thus increases UL latency.

However, a subframe in frame structure 8) is used in LTE in a similar structure and thus may be used alone without being associated with frame structure 6). Accordingly, the UE may not recognize the subframe in frame structure 8).

Second Method

When N frame structures are dynamically changed, if information about dynamically changed frame structures is included in a DL control region, there may be a subframe which cannot be determined by a UE whether it is a subframe having a UL control region. Frame structure 8) among the 8 frame structures in the first method may correspond to the aforementioned subframe.

A signaling method on the assumption that frame structures are dynamically changed and dynamic changes in the frame structures are signaled in a DL control region in the second method will be described.

On the assumption that N frame structures are dynamically changed, M sequences are designed for M frame structures having DL control regions. In addition, the M sequences are one-to-one mapped to the M frame structures having DL control regions. Sequences respectively corresponding to N−1 frame structures are transmitted in DL control regions of the corresponding frame structures. No sequence is allocated to frame structures which have no DL control region but the types of which can be determined through a previous DL control region as in multiple TTI transmission. In addition, no sequence is allocated to frame structures (e.g., frame structure 8) in the first method) which have no DL control region and the types of which cannot be determined. Here, sequences are not transmitted in frame structures having no DL control region.

A reception UE determines a current frame structure by comparing the M sequences in DL control regions. In addition, the UE is also aware of a subframe which has no DL control region due to multiple TTI transmission but the current frame structure type of which can be known through a previous LD control region.

For example, when the UE recognizes multiple TTI DL/UL transmission through DL control, if the UE searches subframes for ACK/NACK transmission, the UE recognizes presence of a UL control region in the last subframe in which multiple TTI transmission ends through the DL control region of the first subframe for multiple TTI transmission. Alternatively, when a DL control region appears in a subframe in the middle of multiple TTI transmission, the UE may recognize presence of a UL control region in the last subframe through the DL control region in order to search subframes for ACK/NACK transmission.

However, in the case of a frame structure (e.g., frame structure 8)) which has no DL control region and cannot be determined, when energy detected through a sequence with respect to the frame structure is equal to or less than a threshold value, the frame structure is determined as a UL resource (e.g., subframe 8) in the first method) having a UL control region and data without a DL control region.

In the second method of the present invention, a sequence one-to-one mapped to a frame structure having a DL control region may be used with a sequence in the DL control region or used with a sequence of a reference signal associated with the DL control region (or in a frame structure having the DL control region).

In the present invention, a UE may perform sequence energy detection in order to detect a UL control region. If information such as ACK/NACK is transmitted at a set timing, a frame structure in which an eNB can transmit ACK/NACK at the timing may be selected and energy detection may be performed. However, it is difficult to dynamically change frame structures as in the second method.

When ACK/NACK cannot be transmitted at a set timing, ACK/NACK may be transmitted within several subframes after a predetermined time from DL transmission. To this end, at least one of the following rules may be required.

A) A specific frame structure should exist in one or more subframes within a time window: The specific frame structure may be regarded as a combination of several frame structures. For example, if there are 8 frame structures 1), 2), 3), 4), 5), 6), 7) and 8) described in the first method, frame structures 3), 4), 5) and 8) having UL control regions may be regarded as a specific frame structure. In addition, at least one of frame structures 3), 4), 5) and 8) should exist in one or more subframes within the time window.

B) Frame structures are grouped such that time axes do not overlap and a specific frame structure should exist in one or more subframes in each group: The specific frame structure may be regarded as a combination of several frame structures. For example, if there are 8 frame structures 1), 2), 3), 4), 5), 6), 7) and 8) described above, frame structures 3), 4), 5) and 8) having UL control regions may be regarded as a specific frame structure. In addition, at least one of frame structures 3), 4), 5) and 8) should exist in one or more subframes within a time window.

In rules A) and B), the specific frame structure may be one of frame structures designed for dynamic frame structures. For example, one of frames structures 1), 2), 3), 4), 5), 6), 7) and 8) in the first method may be the specific frame structure. These rules are for the purpose of preventing signals such as ACK/NACK timing from being significantly delayed.

Furthermore, rule C) below may be applied to an ACK/NACK timing in association with rules A) and B).

C) ACK/NACK is transmitted in a frame structure in which UL data appearing first in a specific time window after t ms from transmission of downlink data is transmitted. For example, when rule C) is applied, restriction such as a time window may not be present. If an eNB has generated one or more subframes capable of carrying ACK/NACK within a specific time, ACK/NACK may be transmitted in a frame structure in which UL data appearing first after t ms is transmitted without a time window.

Furthermore, a time window is a restriction which can be searched by a UE only for a predetermined time or less and may be set to reduce UE complexity.

In addition, the value t may be set differently for UEs (e.g., UE capabilities) or services (e.g., service characteristics). When the value t is different for UEs or services, the value t may be semi-statically signaled to a UE through RRC signaling.

Alternatively, when DL reception and ACK/NACK transmission are simultaneously performed in a subframe in a frame structure such as the self-contained frame structure, the value t may be set to 0 and signaled.

Here, t ms may be changed to t subframes.

Moreover, it is most desirable to transmit ACK/NACK in a UL control region. Accordingly, X1 and X2 may be set as follows.

X1. CDM: This has the advantage that diversity can be obtained and the disadvantage that resource efficiency decreases when there is a small amount of ACKL/NACK.

X2. FDM: This has the advantage that resources can be efficiently used and the disadvantage that diversity is low.

These two may be used as a hybrid. For example, FDM may be performed and then CDM may be performed. In such a case, the advantages and disadvantages of CDM and FDM may be mixed to a certain extent.

That is, there is a problem that a code index for ACK/NACK transmission should be selected per UE when CDM is used, whereas there is a problem that a frequency band for ACK/NACK transmission should be selected when FDM is used.

Here, code indices for CDM and frequency bands for FDM are collectively defined as ACK/NACK resource indices. Furthermore, in the case of FDM, resources in which frequencies are continuously connected may also be included. Accordingly, when a hybrid of CDM and FDM is used, code indices for CDM and frequency band indices for FDM are divided into different index sets and one-to-one mapped to ACK/NACK resource indices.

Third Method

In the present invention, parameters described below are used as inputs in order to generate an ACK/NACK resource index.

A) A time index may be used as an input for generation of an ACK/NACK resource index in the present invention. The time index refers to a time elapsed from DL transmission, at which ACK/NACK is transmitted. (For example, an index is generated according to how many subframes are ahead of ACK/NACK transmission.)

B) A DL control channel index is used as an input for generation of an ACK/NACK resource index in the present invention. When UEs have different DL control indices, these DL control indices may be used to generate ACK/NACK resource indices.

C) A lowest frequency index of a received DL resource is used as an input for generation of an ACK/NACK resource index in the present invention. For example, when UEs receive different DL resources, these DL resources may be used to generate ACK/NACK resource indices. Although the lowest frequency index may be an actual resource element index, this may be an index of a certain resource block or an index of multiple resource blocks.

D) An index indicated in a DL control region is used as an input for generation of ACK/NACK resource indices in the present invention.

E) ACK/NACK resource index may be set per UE in advance through RRC signaling.

In the third method, A, B, C, D and E may be selectively combined. In method A, resources of UEs which transmit ACK/NACK may be separated after lapses of different times from DL transmission. To prevent collision between UEs which transmit ACK/NACK after lapse of the same time, a control channel index may be used as in method B or a frequency index may be used as in method C along with method A.

In the third method, method B has the advantage that ACK/NACK resources of UEs can be separated even when multi-user scheduling is performed, compared to method C.

A directly specified index may be used as in method D or E.

However, to reduce overhead with respect to indices, method D or E may be used in association with method A, B or C.

That is, only information about some ACK/NACK resources may be indicated through method D or E and information about other ACK/NACK resources may be indicated through method A, B or C.

Furthermore, which one of methods A, B, C, D and E of the third method will be used or which combination thereof will be used may be determined through RRC signaling. Alternatively, for a UE which needs to urgently change ACK/NACK resource indices, method D or E may be used and other methods or combinations of other methods may be used by overlapping indication sets. Here, if different indices are indicated, which method has priority may be previously set.

Figure 6:
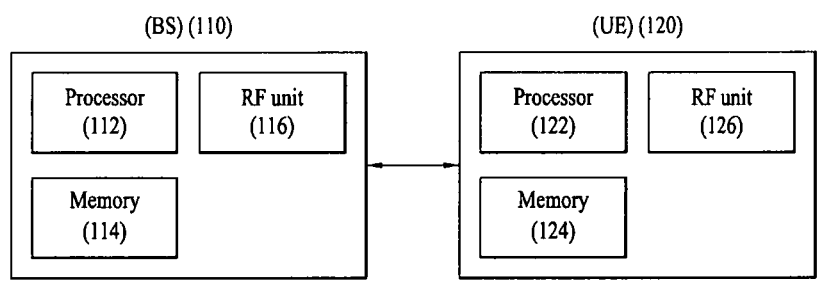
FIG. 6 illustrates a base station and a UE to which the present invention is applicable.

FIG. 6 illustrates a base station (BS) and a UE applicable to an embodiment of the present invention.

When a wireless communication system includes a relay, communication is performed between a BS and the relay on a backhaul link and communication is performed between the relay and a UE on an access link. Accordingly, the BS or UE shown in the figure may be replaced by the relay as necessary.

Referring to FIG. 6, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124 and a radio frequency (RF) unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described method and device for setting a frame structure in a wireless communication system can be applied to various wireless communication systems.

The invention claimed is:

1. A method of transmitting acknowledgement/negative-acknowledgement (ACK/NACK) by a UE in a wireless communication system, comprising:
receiving downlink data resource allocation information indicating a specific subframe for ACK/NACK transmission; and
transmitting ACK/NACK in the specific subframe,
wherein the downlink data allocation information includes a specific sequence among a plurality of sequences defined for a downlink control region, and a frame structure of the specific subframe is determined on the basis of the specific sequence,
wherein the downlink data resource allocation information indicates at least one subframe having an uplink control region present in a predetermined time window, and
wherein the time window is set differently for UE capabilities or service characteristics and is indicated through Radio Resource Control (RRC) signaling.

2. The method according to claim 1, wherein the downlink data resource allocation information is indicated using a subframe unit composed of at least one subframe.

3. The method according to claim 1, wherein the downlink data resource allocation information further indicates an ACK/NACK resource region based on the structure of the specific subframe.

4. The method according to claim 1, wherein the downlink data resource allocation information further indicates a plurality of subframes for ACK/NACK transmission, the method further comprising selecting the specific subframe among the plurality of subframes for ACK/NACK transmission.

5. The method according to claim 1, further comprising determining a first subframe and a last subframe associated with multiple TTI (Transmission Time Interval) transmission on the basis of the downlink data resource allocation information and determining structures of a plurality of subframes for multiple TTI transmission.

6. The method according to claim 5, wherein the last subframe is an uplink subframe, and the last subframe is determined by detecting sequences of the plurality of subframes for multiple TTI transmission.

7. The method according to claim 1, wherein the uplink control region present in the predetermined time window is an uplink control region present for each of time groups which do not overlap.

8. The method according to claim 1, wherein the ACK/NACK is generated by applying FDM (Frequency Division Multiplexing) and then applying CDM (Code Division Multiplexing).

9. The method according to claim 8, wherein the ACK/NACK is mapped to an ACK/NACK resource index defined by combining a code index for CDM and a frequency band for FDM.

10. The method according to claim 9, wherein the ACK/NACK resource index is determined on the basis of one of a time index, a downlink control channel index, a lowest frequency index of a downlink resource, an index indicated in a downlink control region and a resource index according to RRC signaling.

11. The method according to claim 1, wherein the specific sequence uses a reference signal sequence.

12. A UE transmitting acknowledgement/negative-acknowledgement (ACK/NACK) in a wireless communication system, comprising:
a radio frequency (RF) unit including a transceiver; and
a processor,
wherein the processor is configured to receive downlink data resource allocation information indicating a specific subframe for ACK/NACK transmission and to transmit ACK/NACK in the specific subframe,
wherein the downlink data allocation information includes a specific sequence among a plurality of sequences defined for a downlink control region, and a frame structure of the specific subframe is determined on the basis of the specific sequence.
wherein the downlink data resource allocation information indicates at least one subframe having an uplink control region present in a predetermined time window, and
wherein the time window is set differently for UE capabilities or service characteristics and is indicated through Radio Resource Control (RRC) signaling.

* * * * *